United States Patent
Kito et al.

(10) Patent No.: US 9,327,675 B2
(45) Date of Patent: May 3, 2016

(54) VEHICLE-BODY FRONT STRUCTURE OF VEHICLE

(71) Applicant: MAZDA MOTOR CORPORATION, Hiroshima (JP)

(72) Inventors: Masatoki Kito, Hiroshima (JP); Hiroshi Sogabe, Aki-gun (JP); Hirofumi Takada, Higashihiroshima (JP); Tsutomu Watanabe, Hiroshima (JP); Arihiro Furumoto, Hiroshima (JP); Ryuma Murakami, Hiroshima (JP); Takayuki Nakamae, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/454,413

(22) Filed: Aug. 7, 2014

(65) Prior Publication Data

US 2015/0054306 A1   Feb. 26, 2015

(30) Foreign Application Priority Data

Aug. 21, 2013 (JP) ................. 2013-171391

(51) Int. Cl.
| | | |
|---|---|---|
| *B60J 9/00* | (2006.01) | |
| *B60R 21/34* | (2011.01) | |
| *B62D 25/08* | (2006.01) | |
| *B60R 19/12* | (2006.01) | |
| *B60R 21/00* | (2006.01) | |

(52) U.S. Cl.
CPC ............... *B60R 21/34* (2013.01); *B60R 19/12* (2013.01); *B62D 25/08* (2013.01);
(Continued)

(58) Field of Classification Search
CPC .......... B29L 2031/24; B29L 2031/265; B29L 2016/00; B29L 2023/186; B29L 2031/26; B29L 2023/005; B29L 2031/005; B29L 2031/302; B29L 2031/60; B29L 2031/7134; B60J 10/002; B60J 10/0031; B60J 10/004; B60J 10/0042; B60J 10/081; B21D 39/00; B28B 10/0031; B28B 23/0043; B32B 27/32; B43K 23/02; B43L 13/02; B43L 13/10; B64D 2700/62429; B64D 37/005; B65G 45/22; B66B 11/08; B66B 1/3492
USPC .................. 296/231, 187.09, 193.09, 187.04, 296/203.02; 180/68.6; 280/762; 293/117, 293/115
See application file for complete search history.

(56) References Cited

U.S. PATENT DOCUMENTS 6,428,065 B2 *   8/2002   Sato et al. ..................... 293/121
6,513,843 B1    2/2003   Frederick et al.
(Continued)

FOREIGN PATENT DOCUMENTS

| CN | 1868786 A | 11/2006 |
|---|---|---|
| CN | 101148175 A | 3/2008 |

(Continued)

OTHER PUBLICATIONS

The First Office Action issued by the Chinese Patent Office on Jan. 27, 2016, which corresponds to Chinese Patent Application No. 201410391926.8 and is related to U.S Appl. No. 14/454,413.

*Primary Examiner* — Jason S Morrow
*Assistant Examiner* — Sunsurraye Westbrook
(74) *Attorney, Agent, or Firm* — Studebaker & Brackett PC

(57) ABSTRACT

A pair of right-and-left brackets which extend obliquely downward and forward from respective front portions of a pair of right-and-left side frames are provided. A stiffener which extends in a vehicle width direction below a bumper beam is attached to respective front ends of the pair of right-and-left brackets. The stiffener is configured such that its front end portion slants downward and forward and has an open cross section, and its rear end portion thereof has a closed cross section. An obstacle can be prevented from coming in below a vehicle-body front portion, and also the sufficient energy absorption in a collision and the prompt flicking-up of an obstacle can properly achieved.

7 Claims, 5 Drawing Sheets

(52) U.S. Cl.
CPC .. *B60R 2021/002* (2013.01); *B60R 2021/0004* (2013.01); *B60R 2021/0037* (2013.01); *B60R 2021/0053* (2013.01); *B60R 2021/343* (2013.01)

(56) References Cited

U.S. PATENT DOCUMENTS

| | | | |
|---|---|---|---|
| 6,620,369 B1 * | 9/2003 | Mead | 264/409 |
| 6,663,151 B2 | 12/2003 | Mansoor et al. | |
| 7,438,348 B2 * | 10/2008 | Nakamae et al. | 296/187.04 |
| 7,575,271 B2 * | 8/2009 | Hasegawa et al. | 296/187.04 |
| 7,992,926 B2 * | 8/2011 | Tamakoshi | 296/187.09 |
| 8,403,403 B2 * | 3/2013 | Tashiro et al. | 296/187.09 |
| 2008/0067838 A1 | 3/2008 | Nakamae et al. | |
| 2009/0140546 A1 * | 6/2009 | Okabe et al. | 296/187.09 |
| 2010/0201159 A1 | 8/2010 | Chretien et al. | |

FOREIGN PATENT DOCUMENTS

| | | |
|---|---|---|
| CN | 101203415 A | 6/2008 |
| EP | 1726490 A1 | 11/2006 |
| JP | 2009-179139 A | 8/2009 |

* cited by examiner

Front

Front

VEHICLE-BODY FRONT STRUCTURE OF VEHICLE

BACKGROUND OF THE INVENTION

The present invention relates to a vehicle-body front structure of a vehicle.

An automotive vehicle, as a vehicle, comprises a pair of right-and-left side frames extending longitudinally at a vehicle-body front portion and a bumper beam extending in a vehicle width direction and attached to respective front ends of the pair of right-and-left side frames. Further, the automotive vehicle may be equipped with a protecting member including a stiffener (which may be called a lower bumper beam) extending in the vehicle width direction which is provided below the bumper beam in order that when a vehicle collides with a front obstacle, especially when a pedestrian's leg portion hits, the obstacle is restrained from coming in below the vehicle-body front portion. As the above-described protecting member, a structure which can effectively absorb collision energy (impact) in the collision with a properly short stroke is disclosed in Japanese Patent Laid-Open Publication No. 2009-179139.

Herein, in a case in which the front obstacle is a pedestrian, the protecting member collides with the pedestrian's leg portion. In this case, preventing the obstacle from coming in below the vehicle-body front portion can be achieved by the protecting member itself. Further, restraining partial deformation of the obstacle (an injury of the leg portion, for example) may be provided by energy absorption through deformation of the protecting member. Particularly, the protecting member may collide with a lower portion of the pedestrian's leg portion (a portion below a knee), whereas a front end portion of an engine hood (a bonnet) of the vehicle collides with an upper portion of the leg portion above the knee, so that the collision energy (impact) may be properly absorbed through its dispersion at the upper and lower portions of the leg portion.

Meanwhile, in a vehicle, such as a sports car, in which the level of a front end of the engine hood (or a front end of a vehicle-body exterior member positioned in front of the engine hood) is considerably low, it may be difficult to absorb the collision energy at a higher level than the knee of the leg portion of the pedestrian as the obstacle, for example. Particularly, in a case in which the obstacle is the pedestrian, it may be preferable that the pedestrian be flicked up onto the engine hood after the collision.

According to the protecting member of the above-described patent document, however, it may be difficult to obtain both the energy absorption sufficient for the partial deformation restraint of the obstacle and the flicking-up of the obstacle by means of the protecting member only. Especially, since a load/deformation characteristic showing a relationship of a collision load and a deformation amount of the protecting member of the above-described patent document is configured such that the deformation amount increases substantially proportionally to an increase of the collision load, it may be difficult to satisfy both the sufficient energy absorption in the collision and the flicking-up of the obstacle by means of the protecting member only.

SUMMARY OF THE INVENTION

The present invention has been devised in view of the above-described matters, and an object of the present invention is to provide a vehicle-body front structure of a vehicle which can properly achieve the sufficient energy absorption in the collision and the prompt flicking-up of the obstacle, preventing the obstacle from coming in below the vehicle-body front portion.

According to the present invention, there is provided a vehicle-body front structure of a vehicle, comprising a pair of right-and-left side frames extending longitudinally at a vehicle-body front portion, a bumper beam extending in a vehicle width direction and attached to respective front ends of the pair of right-and-left side frames, a pair of right-and-left brackets extending obliquely downward and forward from respective front portions of the pair of right-and-left side frames, and a stiffener extending in the vehicle width direction below the bumper beam and attached to respective front ends of the pair of right-and-left brackets, wherein the stiffener is configured such that a front end portion thereof slants downward and forward and has an open cross section, and a rear end portion thereof has a closed cross section. Herein, the above-described bracket may be attached to a front end portion of the side frame directly or indirectly via another member, such as a setting plate.

According to the present invention, in a first stage from a collision start of the vehicle's colliding with a front obstacle, the obstacle can be properly prevented from coming in below the vehicle-body front portion by means of the supporting function of the brackets and the stiffener (in a high-rigidity state). Further, in a second stage subsequent from the first stage, since the front end portion of the stiffener slants downward and forward and has the open cross section, the stiffener deforms in such a manner that it slants downward and rearward, thereby becoming in a low-rigidity state, so that collision energy can be properly absorbed. Then, in a third stage after the second stage, since the stiffener which has deformed is substantially aligned with the brackets extending obliquely downward and forward, the stiffener generates a large resistant force (a high rigidity), cooperating with the brackets, so that it can properly perform the function of flicking the obstacle up. Particularly, in a vehicle not having any portion which collides at a sufficiently-higher level than a knee portion of a pedestrian, for example, the energy absorption can be achieved sufficiently and also the protection of the pedestrian can be properly improved.

According to an embodiment of the present invention, a portion of the stiffener around an attachment portion of the stiffener to the bracket has an open cross section over an entire longitudinal length thereof. In this embodiment, it can be prevented that the rigidity of connection portions of the stiffener to the brackets becomes too high locally, so that the above-described effects of the present invention can be obtained surely.

According to another embodiment of the present invention, the brackets are configured such that a rear-end side portion thereof is wider than a front-end side portion thereof in a side view. In this embodiment, since the sufficient rigidity of the rear-end side portion of the bracket can be ensured despite its light weight, the above-described large resistant force can be surely generated in the above-described third stage.

According to another embodiment of the present invention, the brackets and the stiffener are configured such that a load/deformation characteristic showing a relationship of a collision load and a deformation amount which is obtained thereby in a head-on collision shows three-stage changes which are comprised of a first stage from a collision start, a second stage after the first stage, and a third stage after the second stage, an increasing ratio of the deformation amount relative to the collision load in the second stage being set to be greater than that in the first stage or the third stage. In this embodiment, the specific load/deformation characteristic by the brackets and the stiffener is provided preferably, so that the above-described effects of the present invention can be obtained surely.

According to another embodiment of the present invention, an energy absorbing member extending in the vehicle width direction is attached to a front face of the bumper beam, and a front end of an engine hood or a front end of a front vehicle-body exterior member which is substantially flatly continuous from the front end of the engine hood is positioned in front of the energy absorbing member. In this embodiment, in a vehicle in which the front end of the engine hood or the front end of the front vehicle-body exterior member which is substantially flatly continuous from the front end of the engine hood is located at a considerably low level, the above-described effects can be obtained. Further, when the obstacle is flicked up in the third stage, a lower portion of the obstacle which is located below the front end of the engine hood or the front end of the front vehicle-body exterior member can be properly flicked up by utilizing the above-described front ends as a fulcrum, so that the obstacle can be properly flicked up onto the engine hood and thereby the protection of the obstacle can be achieved surely.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
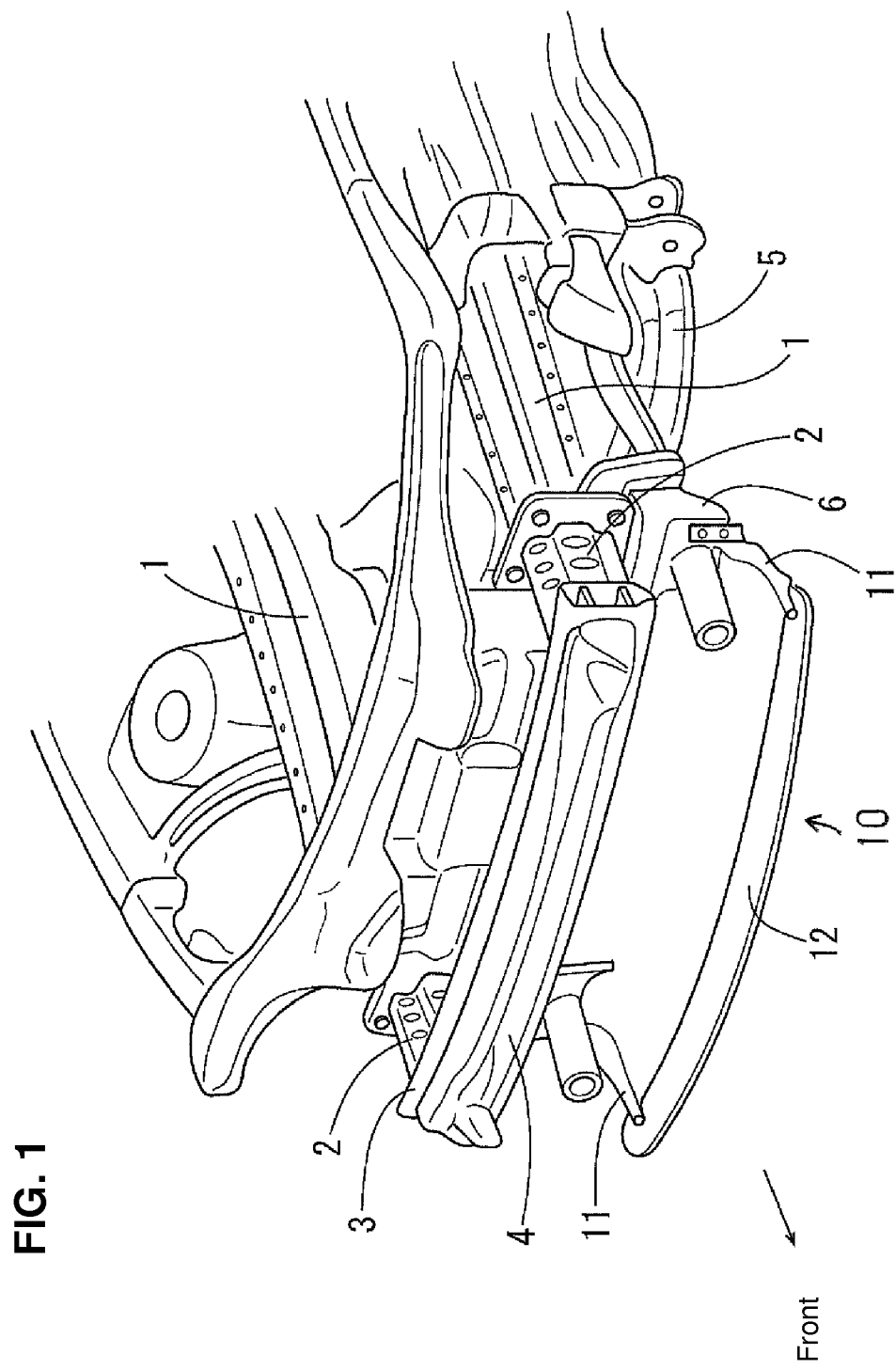
FIG. 1 is a perspective view showing an embodiment of a front structure of a vehicle to which the present invention is applied.

In FIG. 1 showing a front structure of a vehicle, reference character 1 denotes side frames (front side frames) as vehicle-body reinforcing members extending longitudinally. A crash can 2 is attached to a front end of each of the side frames 1. A bumper beam 3 as a reinforcing member extending in a vehicle with direction is attached to a pair of right-and-left crash cans 2. An energy absorbing member 4 which extends in the vehicle width direction is attached to a front face of the bumper beam 3. The energy absorbing member 4 is made from synthetic resin, for example. In FIG. 1, reference character 5 denotes a suspension cross member (suspension frame).

A protecting member 10 which is comprised of brackets 11 and a stiffener (lower bumper beam) 12 is attached to front end portions of the side frame 1 via setting plates 6 as reinforcing members. The bracket 11 and the stiffener 12 are made of a steel-based metal plate, respectively, for example. Herein, the above-described protecting member 10 (the brackets 11 and the stiffener 12) may be attached to the front end portions of the side frames 1 directly without provided any member, such as the above-described setting plates 6.

Figure 2:
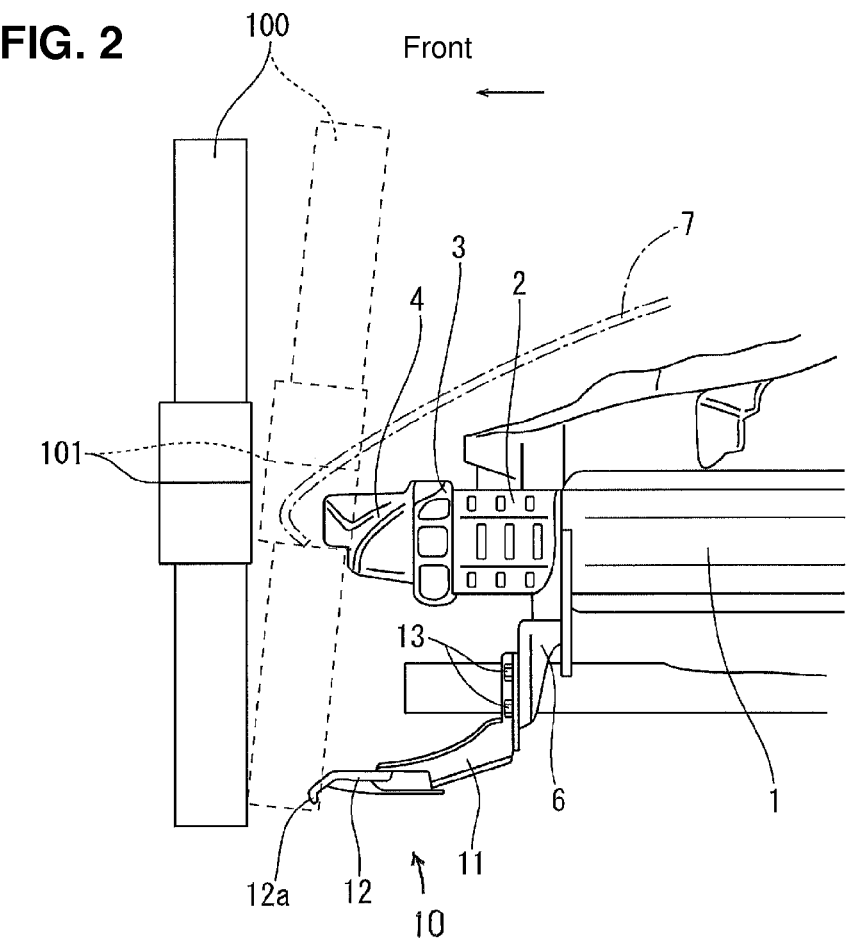
FIG. 2 is a side view of a front portion of the vehicle shown in FIG. 1, which shows a state in which the vehicle collides with an obstacle which is configured to extend vertically.

In FIG. 2, reference character 7 denotes an engine hood (a bonnet) as a vehicle-body exterior member, a front end of which is positioned just in front of the energy absorbing member 4. That is, in the vehicle of the present embodiment, the engine hood 7 is located at a considerably low level, specifically the height of energy absorbing member 4 from a road surface is set at a low level of about 40-50 cm. Herein, the vehicle may be further equipped with a front vehicle-body exterior member (not illustrated) which is flatly continuous from the front end of the engine hood 7 and positioned just in front of the energy absorbing member 4. The present invention is, of course, applicable to any vehicle in which the front end of the engine hood 7 or a front end of the above-described front vehicle-body exterior member is located above the level of the energy absorbing member 4.

Figure 3:
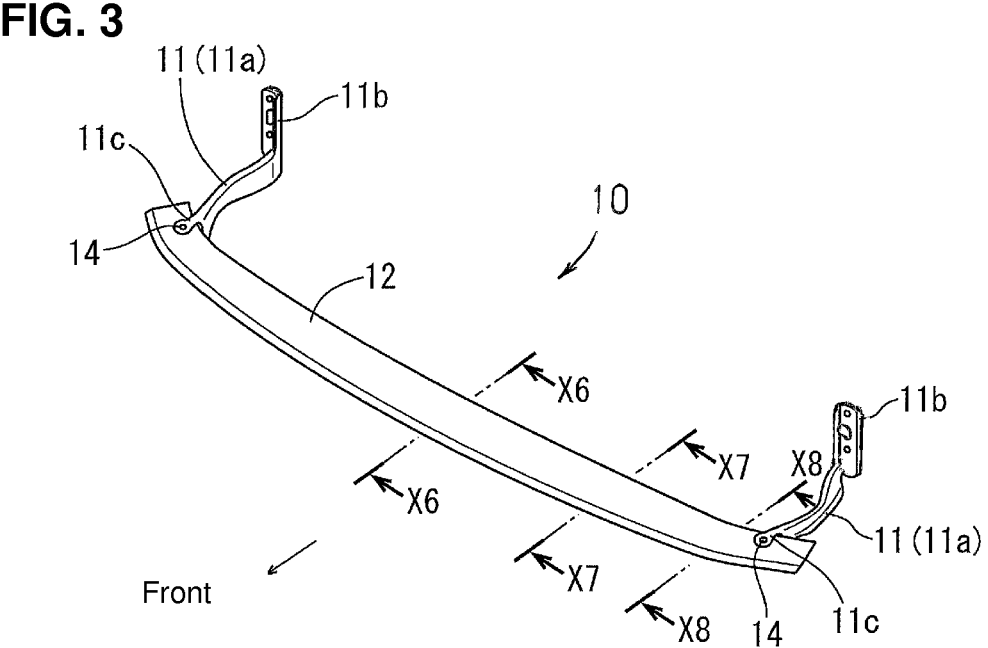
FIG. 3 is a perspective view of an embodiment of brackets and a stiffener which are used for the vehicle shown in FIG. 1.
Figure 4:
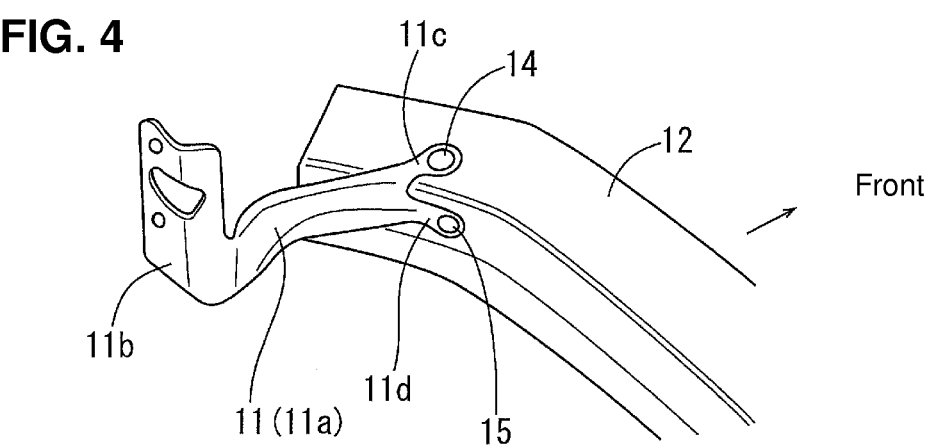
FIG. 4 is a perspective view of a connection portion of the bracket and the stiffener shown in FIG. 3, when viewed from a rear side.
Figure 5:
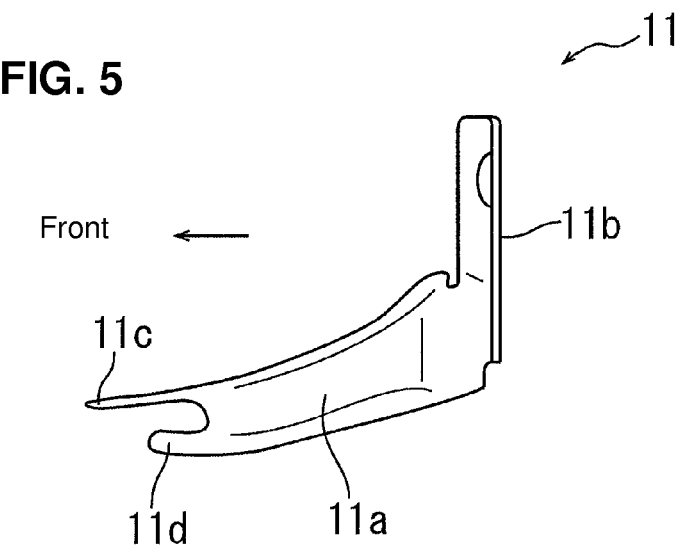
FIG. 5 is a side view of the bracket shown in FIG. 3.

Next, the bracket 11 and the stiffener 12 as the protecting member 10 will be described referring to FIGS. 2-5. The bracket 11 comprises, as shown in FIG. 5 particularly, a body portion 11a having a width which increases gradually toward the rear side, an attaching bracket portion 11b which is formed at a rear end portion of the body portion 11a and extends vertically, and a pair of front attachment portions 11c, 11d which are formed at a front end portion of the body portion 11a. In a state in which the flange portion 11b contacts the setting plate 6, the flange portion 11b is fixed to the setting plate 6 by means of a fixation member 13, such as bolts (see FIGS. 1 and 2). In this fixation state, the bracket 11, i.e., the body portion 11a, takes its position in which it extends obliquely downward and forward (see FIGS. 2 and 5).

The stiffener 12 extends in the vehicle width direction at a lower position below the level of the bumper beam 3 and fixed to respective front ends of a pair of right-and-left brackets 11. As shown in FIGS. 3 and 4, the front attachment portions 11c of the brackets 11 are fixed to an upper face of the stiffener 12 (by welding or by means of fixation members, for example). This fixation portion is denoted by reference character 14. The front attachment portions 11d of the brackets 11 are fixed to a rear face of the stiffener 12 (by welding or by means of fixation members, for example). This fixation portion is denoted by reference character 15.

Figure 6:
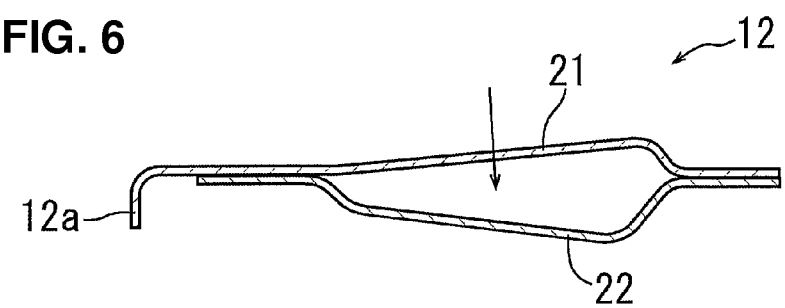
FIG. 6 is a sectional view taken along line X6-X6 of FIG. 3.
Figure 7:
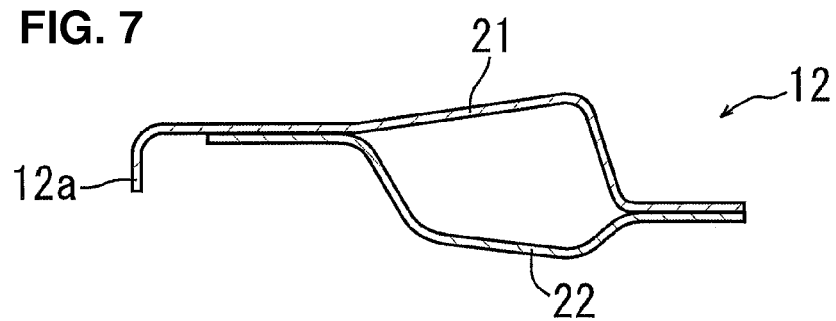
FIG. 7 is a sectional view taken along line X7-X7 of FIG. 3.
Figure 8:
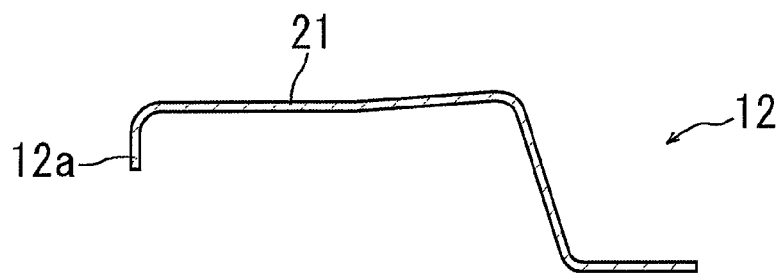
FIG. 8 is a sectional view taken along line X8-X8 of FIG. 3.

Sectional structures of the stiffener 12 are shown in FIGS. 6-8. FIG. 6 shows a cross section of a central portion, in the vehicle width direction, of the stiffener 12, FIG. 8 shows a cross section of a portion of the stiffener 12 around the fixation portion of the stiffener 12 to the bracket 11, and FIG. 7 shows a cross section of another portion located between the respective positions shown in FIGS. 6 and 8. As shown in FIGS. 6 and 7, the stiffener 12 is comprised of a first member 21 and a second member 22, and configured such that its front end portion has an open cross section and its rear end portion has a closed cross section. The longitudinal width of the cross section of the central portion, in the vehicle width direction, of the stiffener 12 is the greatest, and it decreases gradually toward outward both ends of the stiffener 12. And, the above-described portion around the fixation portion of the stiffener 12 to the bracket 11 does have any member corresponding to the above-described second member 22 as shown in FIG. 8, and therefore it has an open cross section over its entire longitudinal length (a structure comprised of one plate member). Thus, by configuring the stiffener 12 such that the size of its closed cross section becomes smaller toward the outward ends of the stiffener 12, i.e., toward the brackets 11, and the portion of the stiffener 12 around the bracket 11 does not have any closed cross section, it is prevented that the rigidity of the outward-end portion of the stiffener 12 becomes too high, compared to that of the central portion, because of an influence of the bracket 11.

As shown in FIG. 2 particularly, the stiffener 12 is configured such that its front end portion having an open cross section shown in FIGS. 6 and 7 slants downward and forward in such a manner that it goes down toward the front. Further, a front end of the stiffener 12 is bent downward with a bending angle of about 90 degrees as shown in FIGS. 6-8. This bending portion is denoted by reference character 12a.

Herein, a case in which a pedestrian as the front obstacle, for example, hits against the protecting member 10 comprised of the brackets 11 and the stiffener 12 will be considered. In this case, the stiffener 12 collides with a leg portion of the pedestrian. In FIG. 2, a flex impactor corresponding to the pedestrian's leg portion is denoted by reference character 100, and a portion corresponding to a joint of a knee of the leg portion is denoted by reference character 101. As understood from FIG. 2, the energy absorbing member 4 hits against a portion around the knee-joint corresponding portion 101 and the stiffener 12 hits against a considerably low position (around an ankle) below the knee-joint corresponding portion 101.

Figure 9:
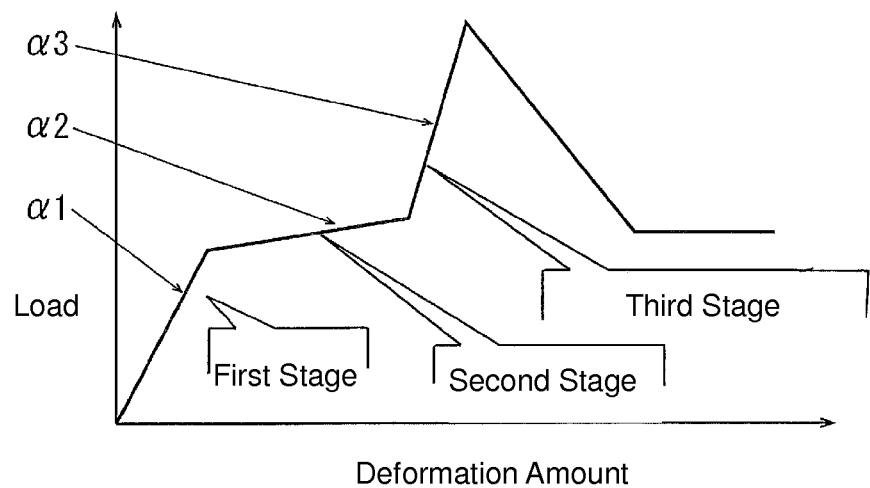
FIG. 9 is a characteristic diagram showing a load/deformation characteristic of a protecting member according to the present invention.

Next, the protection function of the pedestrian by the brackets 11 and the stiffener 12 in the case in which the vehicle collides with the pedestrian as the front obstacle will be described. First, a load/deformation characteristic showing a relationship of a collision load and a deformation amount which is provided by the brackets 11 and the stiffener 12 as the protecting member 10 is set as shown in FIG. 9. That is, in a first stage from a collision start, an increasing ratio of the deformation amount relative to the collision load is relatively small (high rigidity) as shown by a characteristic line α1 because of the stiffener 12. According to this first stage of the load/deformation characteristic, a situation in which the obstacle (the leg portion of the pedestrian, particularly) comes in below the vehicle-body front portion can be prevented.

In a second stage subsequent from the above-described first stage, the increasing ratio of the deformation amount relative to the collision load is relatively large (low rigidity) as shown by a characteristic line α2, compared to the first stage. That is, since the front end portion of the stiffener 12 slants downward and forward, the stiffener 12 deforms in such a manner that it slants downward and rearward when receiving the collision load (that is, the stiffener 12 deforms so as to approach its position in which it is aligned with the bracket 11). Thereby, the collision energy is absorbed, so that a local deformation of the leg portion of the pedestrian as the obstacle can be restrained properly.

In a third stage subsequent from the above-described second stage, the increasing ratio of the deformation amount relative to the collision load is relatively small (high rigidity) as shown by a characteristic line α3, compared to the second stage. That is, while the stiffener 12 deforms in such a manner that it slants downward and rearward so as to approach its position in which it is aligned with the bracket 11 in the above-described second stage, the position of the stiffener 12 in the third stage is finally substantially aligned with the bracket 11. Thereby, since the bracket 11 provides a large resistance against the deformation, the increasing ratio of the deformation amount relative to the collision load becomes smaller. In the present embodiment, the increasing ratio of the deformation amount relative to the collision load in the third stage is set to be the smallest. According to this third stage of the load/deformation characteristic, the pedestrian as the obstacle is flicked up. Herein, the pedestrian can be properly flicked up onto the engine hood 7 in such a manner that a lower portion of the pedestrian is flicked up with a fulcrum positioned around the energy absorbing member 4, so that the safety of the pedestrian can be achieved surely.

Herein, since the bracket 11 is configured such that its rear-end side portion is wider than its front-end side portion in the side view, the sufficient rigidity can be ensured despite its light weight, so that the above-described large resistant force can be surely generated in the third stage (the high-rigidity state can be ensured) (In other words, the bracket 11 can properly resist against a large bending moment acting on the rear-end side portion of the bracket 11 as its base-end portion which is cased by the collision load in the third stage). Meanwhile, in a case in which the width of the bracket 11 is configured to have the same width over its entire longitudinal length in the side view, it may be necessary that the base-end portion (the rear-end side portion) of the bracket is configured to be wide in order to properly resist against the above-described bending moment, which may cause an improperly-wide front-end side portion of the bracket. Consequently, the light-weight of the bracket or the like may not be attained.

The present invention should not be limited to the above-described embodiment, and any other modifications or improvements may be applied within the scope of the claimed invention. In the above-described embodiment shown in FIGS. 6-8, the stiffener 11 is not limited to the one which is comprised of two sprit-sheets of plate members 21, 22, and it may be made of a single sheet of plate which is formed through a bending process in the structure shown in FIGS. 6-8.

What is claimed is:

1. A vehicle-body front structure of a vehicle, comprising:
 a pair of right-and-left side frames extending longitudinally at a vehicle-body front portion;
 a bumper beam extending in a vehicle width direction and attached to respective front ends of the pair of right-and-left side frames;
 a pair of right-and-left brackets attached to respective front portions of the pair of right-and-left side frames and extending obliquely downward and forward from respective front portions of the pair of right-and-left side frames; and
 a stiffener extending in the vehicle width direction below the bumper beam and attached to respective front ends of the pair of right-and-left brackets,
 wherein said stiffener is configured such that a front end portion thereof slants downward and forward and has an open cross section, and a rear end portion thereof has a closed cross section extending in the vehicle width direction, and
 said rear end portion of the stiffener is configured such that a longitudinal width of the closed cross section is the greatest at a central portion, in the vehicle width direction, of the stiffener and decreases gradually toward outward both ends, in the vehicle width direction, of the stiffener.

2. The vehicle-body front structure of a vehicle of claim 1, wherein a portion of said stiffener around an attachment portion of the stiffener to said bracket has an open cross section over an entire longitudinal length thereof.

3. The vehicle-body front structure of a vehicle of claim 2, wherein said brackets are configured such that a rear-end side portion thereof is wider than a front-end side portion thereof in a side view.

4. The vehicle-body front structure of a vehicle of claim 3, wherein an energy absorbing member extending in the vehicle width direction is attached to a front face of said bumper beam, and a front end of an engine hood or a front end of a front vehicle-body exterior member which is substantially flatly continuous from the front end of the engine hood is positioned in front of the energy absorbing member.

5. The vehicle-body front structure of a vehicle of claim 2, wherein an energy absorbing member extending in the vehicle width direction is attached to a front face of said bumper beam, and a front end of an engine hood or a front end of a front vehicle-body exterior member which is substantially flatly continuous from the front end of the engine hood is positioned in front of the energy absorbing member.

6. The vehicle-body front structure of a vehicle of claim 1, wherein said brackets are configured such that a rear-end side portion thereof is wider than a front-end side portion thereof in a side view.

7. The vehicle-body front structure of a vehicle of claim 1, wherein an energy absorbing member extending in the vehicle width direction is attached to a front face of said bumper beam, and a front end of an engine hood or a front end of a front vehicle-body exterior member which is substantially flatly continuous from the front end of the engine hood is positioned in front of the energy absorbing member.

* * * * *